(12) United States Patent
Rogacki et al.

(10) Patent No.: US 8,656,635 B1
(45) Date of Patent: *Feb. 25, 2014

(54) FUMIGATION OF CONTAINERIZED CARGO

(71) Applicants: Fred Rogacki, Fort Lauderdale, FL (US); James Teachman, Fort Lauderdale, FL (US)

(72) Inventors: Fred Rogacki, Fort Lauderdale, FL (US); James Teachman, Fort Lauderdale, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 13/851,994

(22) Filed: Mar. 28, 2013

Related U.S. Application Data

(63) Continuation of application No. 13/346,796, filed on Jan. 10, 2012, now Pat. No. 8,424,240, which is a continuation of application No. 12/429,287, filed on Apr. 24, 2009, now Pat. No. 8,132,357.

(60) Provisional application No. 61/049,154, filed on Apr. 30, 2008.

(51) Int. Cl.
*A01M 13/00* (2006.01)

(52) U.S. Cl.
USPC ............................................. 43/125; 426/320

(58) Field of Classification Search
USPC ................. 43/125, 129, 130; 426/320; 422/3
See application file for complete search history.

(56) References Cited

U.S. PATENT DOCUMENTS

| | | | |
|---|---|---|---|
| 1,743,660 A * | 1/1930 | Edwards | ....................... 422/307 |
| 4,966,755 A | 10/1990 | Smith | |
| 5,055,277 A | 10/1991 | Gunn | |
| 5,318,789 A | 6/1994 | Nakagawa et al. | |
| 5,662,865 A | 9/1997 | Blatchford | |
| 5,678,352 A | 10/1997 | Leitner et al. | |
| 6,047,496 A | 4/2000 | Leitner et al. | |
| 6,256,905 B1 | 7/2001 | White | |
| 6,305,148 B1 | 10/2001 | Bowden et al. | |
| 6,403,027 B1 | 6/2002 | Napoles et al. | |
| 6,457,402 B1 * | 10/2002 | Parker et al. | .................... 99/475 |
| 6,514,550 B1 * | 2/2003 | Frati | ............................. 426/320 |
| 6,588,140 B1 | 7/2003 | Johnson et al. | |
| 6,766,612 B1 | 7/2004 | Liu | |
| 7,908,791 B1 * | 3/2011 | Brash | .............................. 43/125 |
| 2008/0251514 A1 * | 10/2008 | Fitzpatrick et al. | ........... 220/86.1 |
| 2009/0071061 A1 * | 3/2009 | Williame et al. | ............... 43/125 |

FOREIGN PATENT DOCUMENTS

| | | |
|---|---|---|
| JP | 63-163289 | 1/1990 |
| JP | 01-113070 | 12/1990 |
| JP | 01-122034 | 12/1990 |

* cited by examiner

*Primary Examiner* — Christopher P Ellis

(74) *Attorney, Agent, or Firm* — Mark D. Bowen; Malin Haley DiMaggio & Bowen, P.A.

(57) ABSTRACT

An apparatus and method for tarpless fumigation of containerized cargo within a shipping container is disclosed. A portable fumigation containment door is installed in covering relation with main rear opening of a standard cargo container. Pneumatic cylinders are actuated to secure the door in place, and an inflatable gasket extending around the perimeter of the containment door and is inflated to create an airtight seal between the cargo container and the containment door. The door is provided with a series of connection ports for receiving fumigant injection and sampling lines necessary for performing the fumigation process.

6 Claims, 9 Drawing Sheets

FUMIGATION OF CONTAINERIZED CARGO

CROSS REFERENCE TO RELATED APPLICATIONS

This application is a continuation of U.S. patent application Ser. No. 13/346,796, filed on Jan. 10, 2012, which is a continuation of U.S. patent application Ser. No. 12/429,287, filed on Apr. 24, 2009, now U.S. Pat. No. 8,132,357, which claims the benefit of provisional U.S. Patent Application Ser. No. 61/049,154, filed on Apr. 30, 2008.

STATEMENT REGARDING FEDERALLY SPONSORED RESEARCH OR DEVELOPMENT

N/A

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office patent file or records, but otherwise reserves all copyrights rights whatsoever.

BACKGROUND OF THE INVENTION

1. Field of the Invention

The present invention relates generally to a system and method for fumigating containerized cargo without the use of tarpaulin, and more particularly to such a system and method that utilizes a specially adapted portable containment door that creates a seal around the main opening of the shipping container and provides the necessary connection inlets and outlets for fumigant injection and sampling lines.

2. Description of Related Art

Containerization of cargo has revolutionized the shipping industry by increasing efficiency through the creation of standardized shipping containers that are designed for movement through all major modes of transportation, including cargo ships, trucks, and railroad cars. Due to such increases in efficiency, and improvement in refrigerated shipping container designs, a wide variety of products, are now shipped throughout the world. With an increase in the availability of a wide range of products, including perishable items, the risk of transporting harmful pests from one country to another along with the shipped goods also is enhanced. Foreign pests often have the potential of endangering indigenous agriculture and wildlife, thereby causing widespread problems within existing agriculture systems. As a result, a large number of transported cargo, particularly produce, must be fumigated upon arrival in certain destinations.

The standards of the method for fumigating cargo containers are established by the Plant Protection and Quarantine (PPQ) branch of the United States Department of Agriculture (USDA) and are detailed extensively. According to the current conventional method for the fumigation of containerized cargo, a tarpaulin is placed over the single container unit or multiple container units that are being fumigated. The cargo is arranged within the container in a manner such that the gas fumigant effectively circulates and penetrates the stored substances. A series of fans are introduced inside of the container, in order to create a flow of the fumigant. After the fans are placed, gas introduction lines are positioned behind the fans through the main rear doors of the container. At least three gas sampling tubes are placed in specific locations within the bulk containerized cargo and are used to actively monitor the concentration of the fumigant within the cargo during the fumigation process. The containers are typically large shipping containers, however, the tarpaulin method can be used with smaller containers.

Once the fans, sampling tubes, and introduction lines are positioned, one or more tarpaulins are simply draped over the cargo containers and sealed along the ground through either loose or wet sand, sand snakes, water snakes, weights, adhesives, or any other suitable sealing means. After the tarpaulin is sealed, the amount (typically by weight) of fumigant required is calculated based on the contained volume. Once the amount is determined, a gaseous fumigant, such as methyl bromide, is caused to flow through at least one introduction line into the contained volume and hence through the open doors of the tarpaulin covered shipping containers. The fumigant is allowed to flow into the tarpaulin confined space until calculated amount has been introduced. The fumigant concentration level is subsequently sampled, typically using three sampling tubes, to determine whether a predetermined concentration level has been achieved throughout the contained volume. If the concentration level is too low, then additional fumigant may be introduced. Conversely, if the concentration level is too high, then the fumigation time may be reduced. Upon completion of the fumigation phase, the volume is aerated through a method that is in accordance with treatment guidelines and/or the Fumigator's PPQ compliance requirements. The method of aeration typically involves placing fans and exhaust ducts underneath the tarpaulin so that the fumigant is evacuated into the atmosphere in a controlled manner. Once the container is sufficiently aerated, typically to less than 5.0 parts-per-million (5.0 ppm) for methyl bromide, the tarpaulin is removed, and the cargo is subsequently released.

There are many problems associated with using the tarpaulin method for fumigation containerized cargo. First, if performed outside of an enclosed environment, the tarpaulin method of fumigation can only be performed in certain weather conditions, specifically low wind situations. Also, the tarpaulin method is time consuming requiring the placement of a large tarpaulin. Furthermore, during placement and storage the tarpaulin can be damaged by the corners of the containers or other sharp objects, thereby leading to leaks. Finally, many problems have arisen related to the toxicity and ozone depletion characteristics of many used fumigants, especially methyl bromide. Tarpaulins are extremely difficult to completely seal off, leading to the inevitable release of fumigants during the fumigation process. Also the tarpaulin encases a much larger volume than just the container compartment, requiring the use of excess fumigant to adequately fumigate the contents of the cargo container. In turn this excess fumigant is still vented into the atmosphere during the aeration process, leading to greater environmental damage.

As a result of the numerous disadvantages present with the conventional tarpaulin fumigation method, the background art reveals at least one attempt directed to fumigation of containerized cargo without the use of tarpaulin. U.S. Pat. No. 6,403,027, issued to Napoles et al on Jun. 11, 2002 describes such a method for fumigating cargo containers without the use of a tarpaulin. That method, commonly generally described as a "tarpless fumigation method," eliminates the need for a tarpaulin by using the cargo container as an enclosure for containing the fumigant during the fumigation process. The method includes placing fans and gas sampling tubes within the cargo container, and threading the electrical lines of the fans and the lines of the gas sampling tube out through a preexisting drain hole in the bottom of the cargo container. The gas introduction line is placed through another preexisting drain hole. The used drain holes are then sealed using a commercially available sealant, while the unused drain holes are plugged using any suitable means. Finally, after the main rear cargo doors are closed, the fumigant is flowed into the cargo container, and the contents of the cargo container are subsequently fumigated. While the method disclosed by Napoles reduces the amount of space that must be filled with fumigant, it is still prone to leaks. Specifically, it has been found that the main rear doors on a large number of shipping containers, particularly older containers, are damaged, not airtight, or otherwise incapable of maintaining an adequate seal thereby leading to the fumigant leakage from the container directly into the surrounding atmosphere.

There therefore exists a need for an apparatus and method for fumigating containerized cargo that does not utilize a tarpaulin and is both installable and operated in a quick and easy manner. Furthermore, this system must minimize the amount of fumigant that is used and limit the amount of fumigant that leaks out during the fumigation process.

BRIEF SUMMARY OF THE INVENTION

The present invention overcomes the limitations and disadvantages in the art by providing a portable fumigation containment door apparatus for removable temporary installation in covering relation with main rear opening of a standard cargo container. A series of pneumatic cylinders are used to lock the portable containment door in place on the cargo container by extending cylindrical bolts into engagement with the container. An inflatable gasket extends around the perimeter of the containment door and is selectively inflated in order to create a seal between the cargo container and the containment door. The outer surface of the containment door has a series of connection ports for receiving the lines that are necessary for performing the fumigation process. Some of those ports are in fluid communication with corresponding connectors on the inner surface of the containment door. Such connecting apparatus include pneumatic connectors, gas line connectors, and an electrical line connector. The pneumatic connector is provided to couple a pressurized air source to the apparatus to allow for inflation of the peripheral sealing gasket. The gas line connectors are used to couple a gas introduction line for flowing fumigant into the storage container, and multiple reading lines for flowing sampled fumigant out of the container during the fumigation process. The inner surface of the device includes a gas flow line connector that is used to connect the main introduction line through which the gas is flowed into the chamber at a specific position. A series of other flow line connectors serve to connect the gas sampling lines that provided the outflow of sampled gas from within the container. Finally, the inner surface of the device contains an electrical connector that serves as a means of providing power to the fans inside of the storage container as are required by PPQ standards for the creation of a flow of fumigant within the contained volume. A sealable hatch on the containment door allows the user to couple the lines to the connectors on the inner surface once the door is positioned around the rear opening of the cargo container.

The method of fumigation of the present invention includes: (a) fully opening and securing the shipping container doors; (b) placing at least one circulation fan, a tubular fumigant introduction line, and three tubular gas monitoring lines in specific positions within the cargo container; (c) installing corner block seals, and placing the containment door apparatus in inserted covering relation with the cargo container rear opening; (d) securing the containment door by actuation of pneumatic cylinders to extend bolts into engagement with the shipping container; (e) inflating the peripheral gasket to create a seal between the containment door and the shipping container; (f) opening the access hatch and connecting the various sampling and fan power lines using the inner surface connectors provided on the inside surface of the containment door; (g) sealing openings and outside air intakes on the shipping container using any suitable means; and (h) injecting a suitable vaporized fumigant into the container via the fumigant shooting line; and (i) monitoring fumigant concentration.

Accordingly, it is an object of the present invention to provide a system and method for fumigating containerized cargo without the use of a tarpaulin (e.g. a "tarpless" method).

It is another object of the present invention to provide a tarpless system and method for fumigating containerized cargo that minimizes the amount of fumigant required to perform the fumigation.

It is yet another object of the present invention to provide a tarpless system and method for fumigating containerized cargo that minimizes the amount of fumigant that is required to perform the fumigation by introducing the fumigant into a volume defined by the container that is used to hold the cargo.

It is still another object of the present invention to provide a tarpless system and method for fumigating containerized cargo that minimizes the amount of fumigant required to perform the fumigation by limiting the amount of fumigant that is leaked during the fumigation process.

It is furthermore another object of the present invention to provide a tarpless system and method for fumigating containerized cargo that minimizes the amount of fumigant required to perform the fumigation by limiting the amount of fumigant that is leaked during the fumigation process by using a portable containment door to cover and seal the main rear opening of a cargo container.

It is still yet another object of the present invention to provide a tarpless method and system for fumigation containerized cargo that is quickly and easily operated and performed.

In accordance with these and other objects, which will become apparent hereinafter, the instant invention will now be described with particular reference to the accompanying drawings.

DETAILED DESCRIPTION OF THE INVENTION

Figure 1:
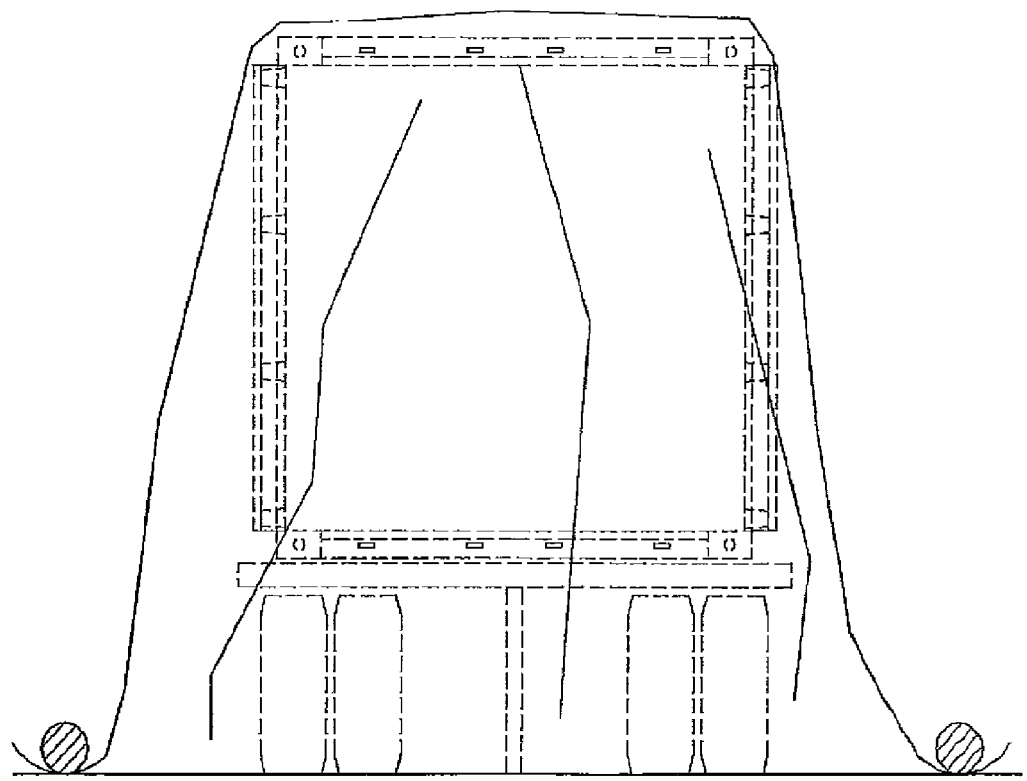
FIG. 1 depicts a trailer mounted shipping cargo container covered by tarpaulin for fumigation in accordance with the accepted prior art method.
Figure 2:
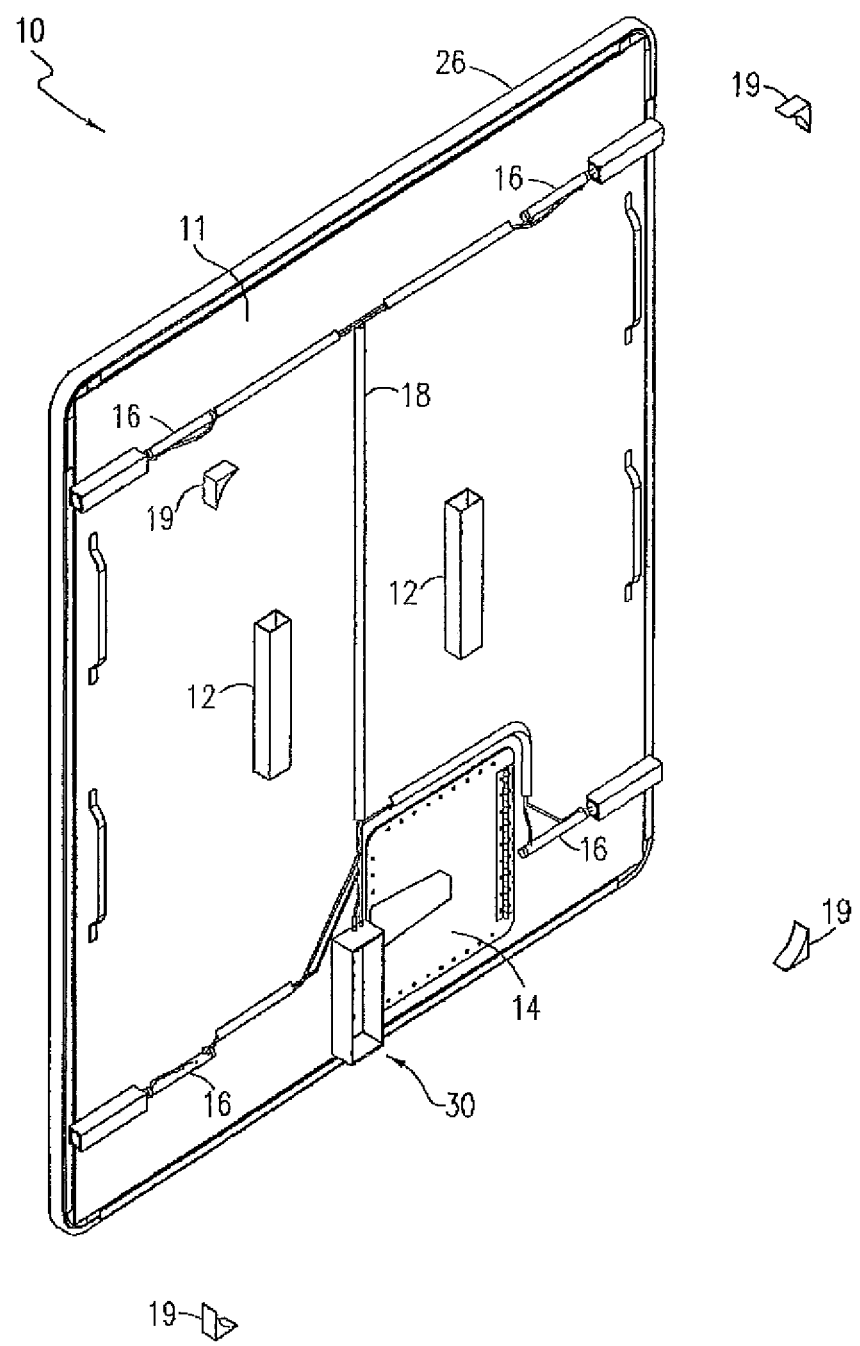
FIG. 2 is a top outer side perspective view of a fumigation containment door apparatus in accordance with the present invention.
Figure 3:
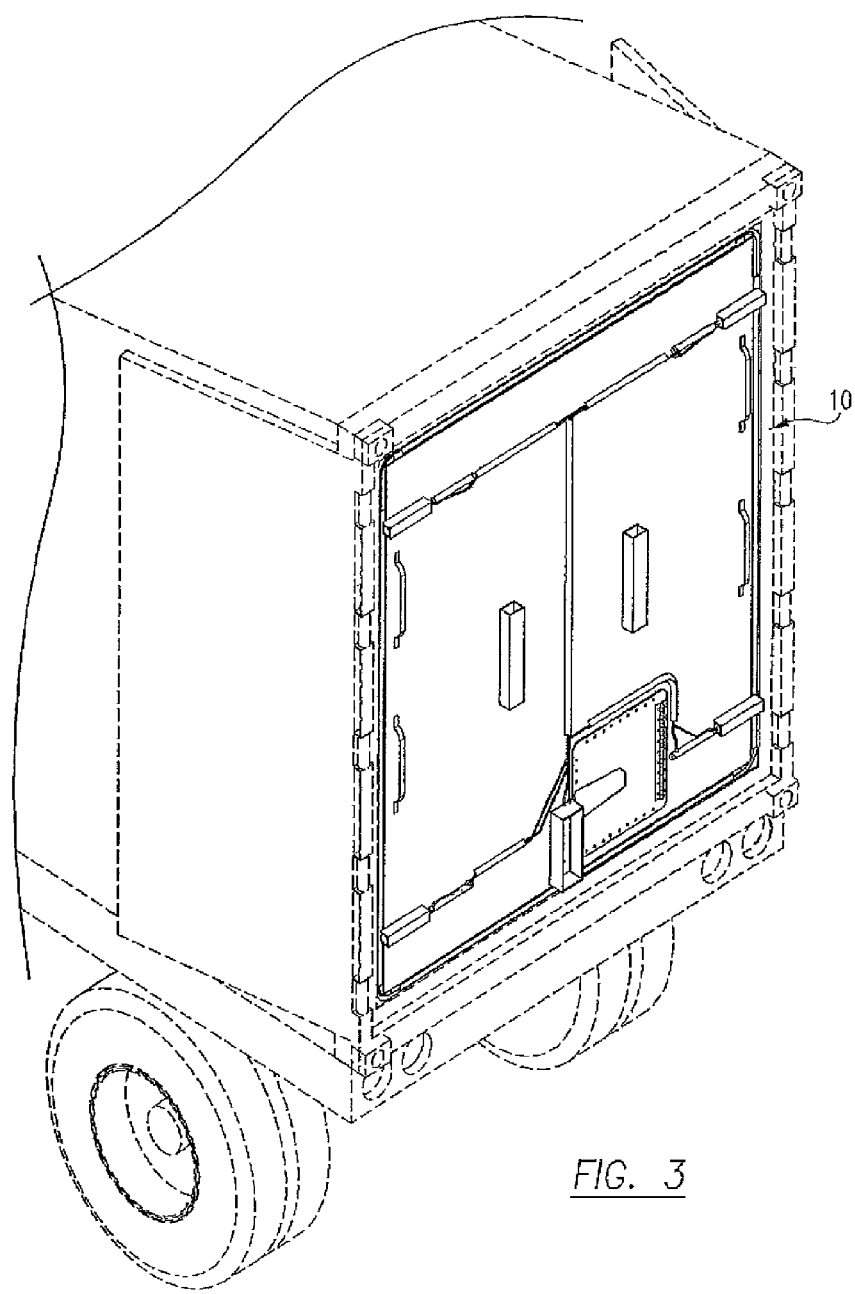
FIG. 3 is a top perspective view showing the fumigation containment door in relation to the open end of a shipping container.

With reference now to the drawings, FIG. 1 illustrates a cargo container covered by tarpaulin in accordance with accepted prior art fumigation methods, and FIGS. 2-14 depict and illustrate fumigation of containerized cargo in accordance with the present invention. As best seen in FIGS. 2 and 3, a portable fumigation containment door 10 is provided. Fumigation containment door 10 is sized to fit within the rear opening of a cargo container. In accordance with a preferred embodiment, door 10 is generally square or rectangular in shape and designed to fit within the standard 7'8⅛" width and 7'5¾" height of the main rear aperture opening of cargo containers with the standard lengths of 20', 40', 45', 48', or 53'. As should be apparent, the overall dimensions may be altered to fit any size or shape opening. Door 10 may be fabricated from metal, such as steel or aluminum, composite material, such as fiberglass or carbon composite, or any other suitable material. In a preferred embodiment, door 10 is fabricated primarily from aluminum.

Door 10 includes a main body 11 having channel members 12 affixed thereto. Each channel member 12 extends from the outer surface of main body 11 and functions as a lifting lug by receiving the prongs of a forklift (not shown). The forklift is preferably adapted by attachment of vertical members, sized for insertion into channel members 12, attached to the ends of the lifting forks. By operatively engaging the forklift, a quick and effective means is provided for lifting and positioning the containment door 10 into and out of the main rear opening of the cargo container. While the present invention discloses the channel member and forklift combination to lift and place door 10, the present invention contemplates any suitable alternate structure to maneuver the door. Fumigation containment door 10 further includes a sealable hatch 14 provides access to the inner chamber of the cargo container through the portable containment door 10 when it is positioned to cover the rear opening of the cargo container. Hatch 14 is connected to door 10 by hinge and latch structures and configurable between open and closed positions. The latching mechanism is used to securely close the hatch 14 and ensure that a seal is formed around the hatch 14.

Figure 4:
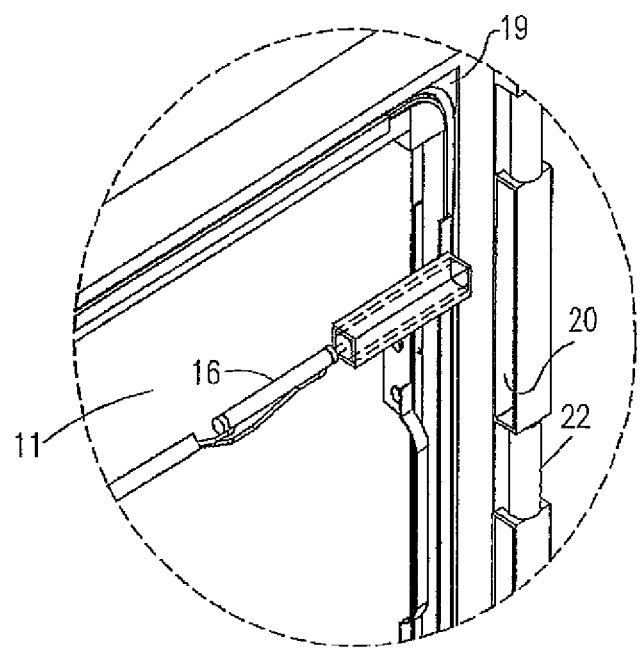
FIGS. 4 and 5 illustrate the use of pneumatic cylinders to engage the shipping container for securing the fumigation containment door apparatus.
Figure 5:
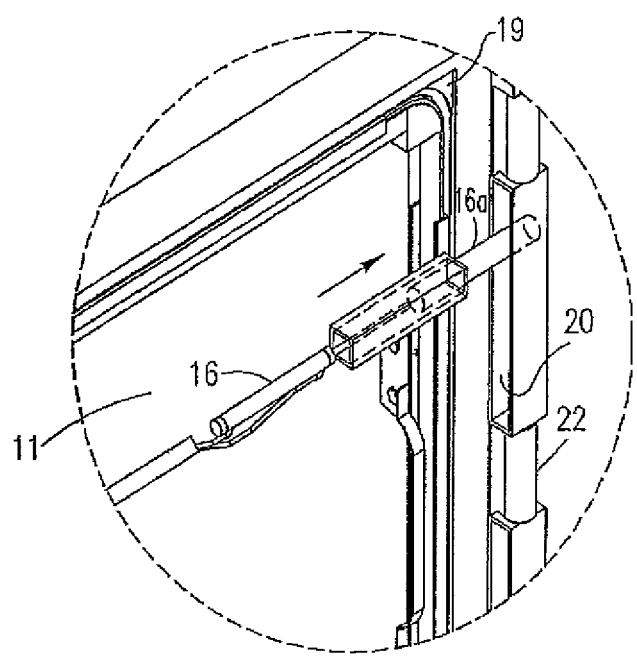
Figure 6:
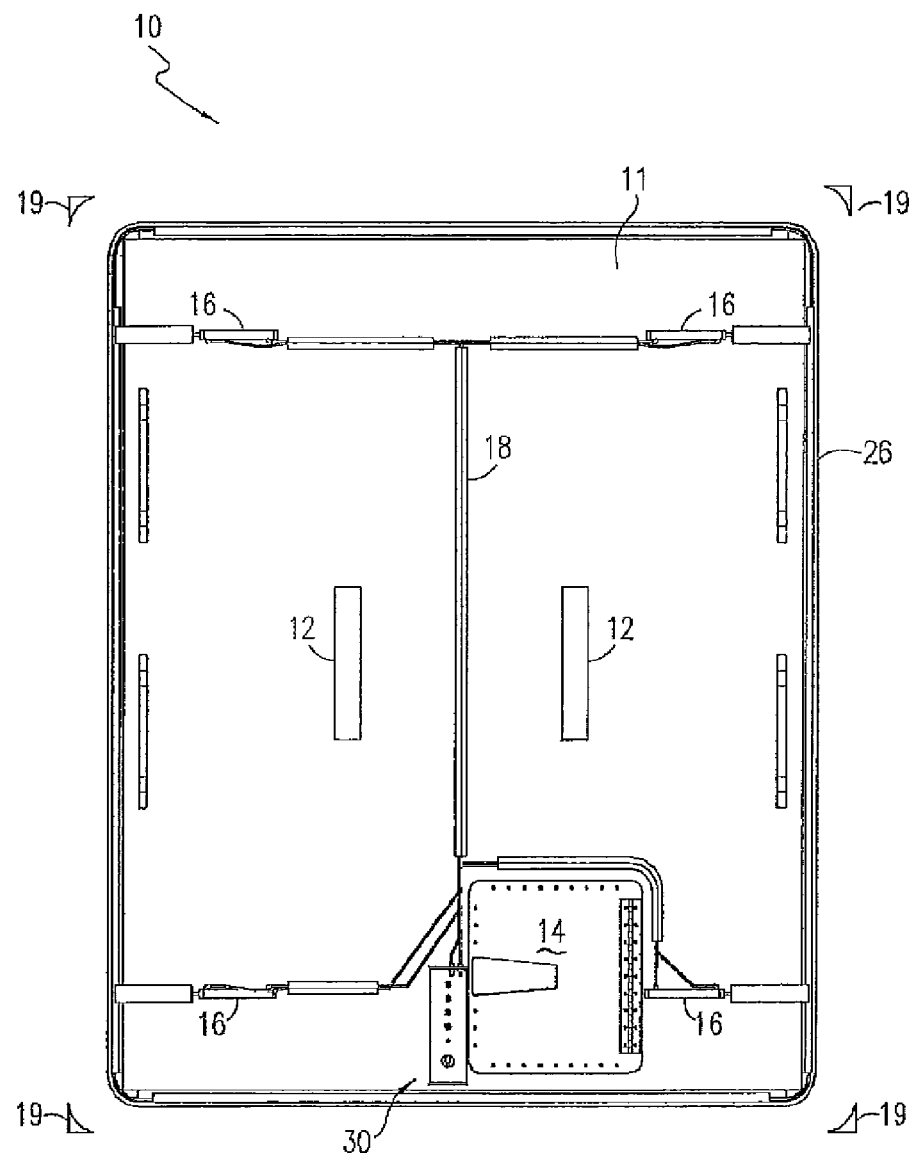
FIG. 6 is a front (outer side) view of a fumigation containment door in accordance with the present invention.

As best seen in FIGS. 2 and 3, a plurality of pneumatic cylinders 16 are positioned in proximity to the outer edges of the containment door 10, with each cylinder 16 oriented in a laterally outward direction relative to containment door 10. Each pneumatic cylinder 16 is connected to two air flow lines that are shielded by a spline 18. Each air flow line is adapted for selective fluid communication with a pressurized gas source, such as compressed air. A first air flow line is used to provide the compressed air to a first cylinder inlet causing the outstroke actuation of the piston member of each pneumatic cylinder 16, and a second air flow line is used to provide compressed air to a second cylinder inlet causing the instroke actuation of the piston member. Spline 18 shields the air flow lines thereby protecting against damage. Pneumatic cylinders 16 function to secure door 10 in the rear opening of a cargo container. As best seen in FIGS. 4 and 5, each pneumatic cylinder includes a piston 16a that fits into grooved flanges 20 that extend from the back of the cargo container. Container flanges 20 support hinges 22 that allow for movement of the doors 24 of the rear cargo between an opened and closed position. By fitting into the grooved flange, pistons 16a of the pneumatic cylinders 16 remain in contact with the grooved flanges, thereby limiting the movement of the portable containment door 10 and locking it into a desired position.

Figure 9:
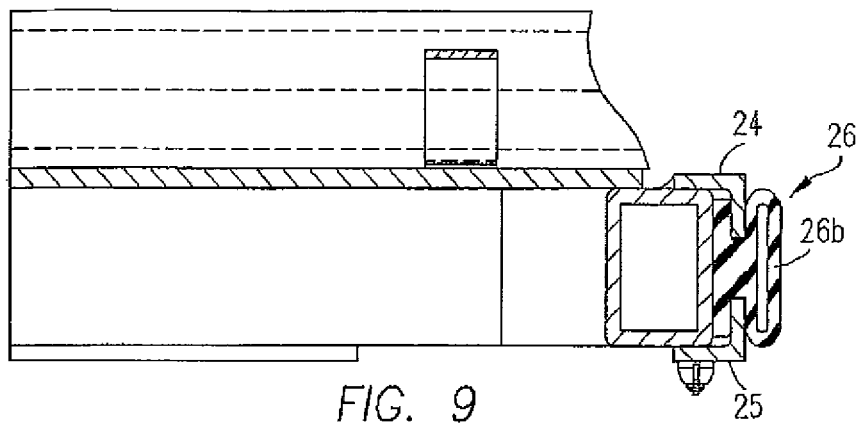
FIGS. 9-11 are partial sectional views showing the peripheral sealing gasket in detail.
Figure 10:
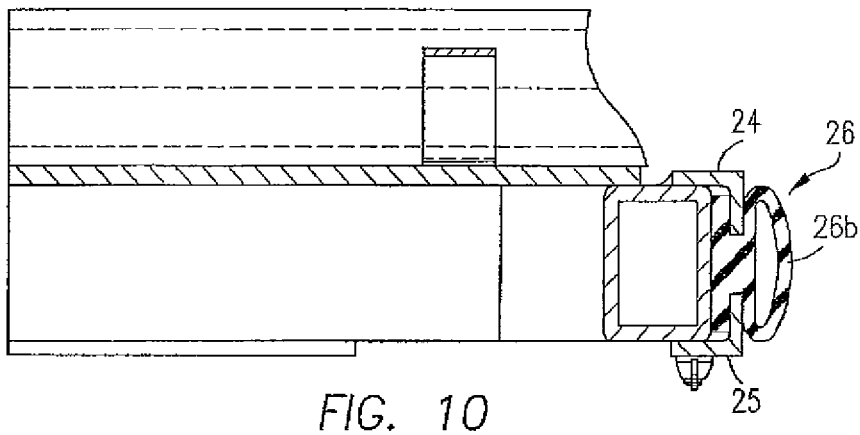
Figure 11:
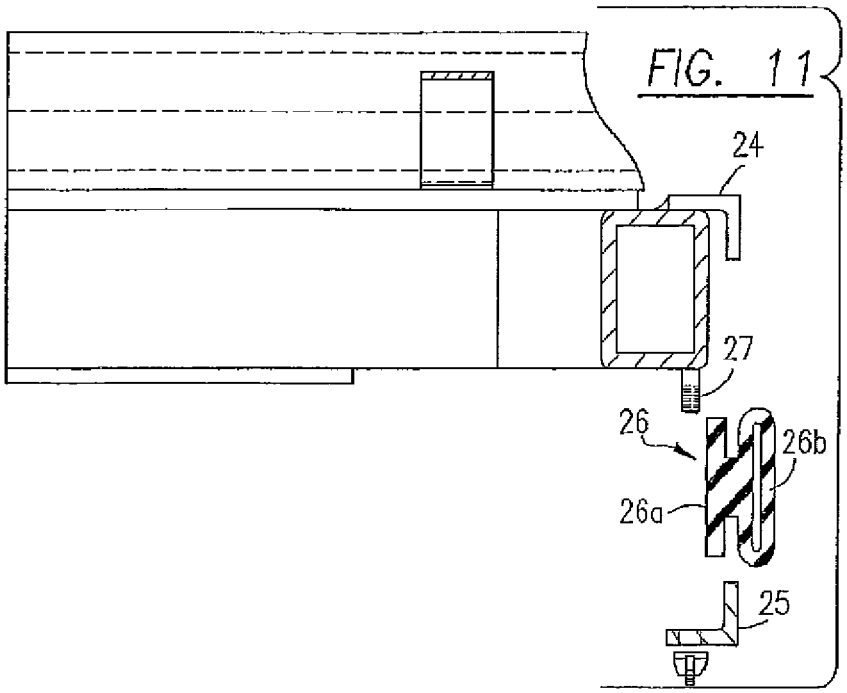
Figure 12:
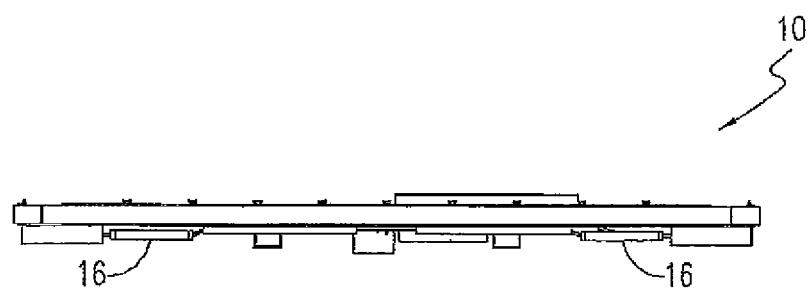
FIG. 12 is a top view of the fumigation containment door.

Fumigation containment door 10 further includes an inflatable sealing gasket 26 extending completely around the peripheral edge. Gasket 26 comprises an inflatable gasket and is preferably fabricated from flexible material that is characterized as being resistant to chemical corrosion due to its repeated exposure to concentrations of methyl bromide. In a preferred embodiment, the material identified as Nitrile has been found to provide a suitable gasket forming material. As best illustrated in FIGS. 9-11, gasket 26 defines a generally T-shaped semi-rigid portion, referenced as 26a that extends transversally across the side edge of door 10. Gasket 26 is removably connected to door 10 by first and second angle brackets 24 and 25. In a preferred embodiment first angle bracket 24 is permanently affixed to the outer side of door 10, and second angle bracket 25 is removably attached thereto by threaded fasteners 27. The T-shaped portion 26a of gasket 26 is sandwiched between the door edge and brackets 24 and 25 as seen in FIG. 9. While the bracket configuration is disclosed in connection with this preferred embodiment, any suitable gasket retaining means is considered within the scope of the present invention.

In the preferred embodiment inflatable gasket 26 extends completely around the periphery of door 10 to provide a complete peripheral seal. Gasket 26 is selectively configurable between a non-inflated configuration as seen in FIG. 9 and an inflated configuration as seen in FIG. 10, by an inflation valve. More particularly, gasket 26 includes a flexible bubble shaped region 26b that extends from the T-shaped base 26a. Bubble shaped region 26b is flexible thereby allowing it to expand and contract with the inflating and deflating of the gasket 26. As the flexible bubble shaped gasket region 26b expands as a result of inflation, the outside of the bubble shaped gasket region 26b make contact with and subsequently exerts an outward force against the walls of the rear opening of the cargo container. Through this outwardly exerted force, a seal is created between the portable containment door 10 and the cargo container. This seal minimizes the amount of fumigant that escapes from the cargo container during the fumigant process, thereby lowering the overall amount of fumigant that is used during the fumigation process. As best seen in FIG. 2, door 10 has generally rounded or radiussed corners. Accordingly, the present invention further provides corner seals 19. Each corner seal 19 preferably comprises a generally triangular sealing structure having straight legs disposed at 90 degrees and a concavely radiussed hypotenuse. Corner seals 19 are preferably positioned so as to engage the corners of the cargo container with the radiussed hypotenuse engaging one of the convex corners of door 10. Corner seals 19 may be adhesively secured to the corners of door 10.

Figure 13:
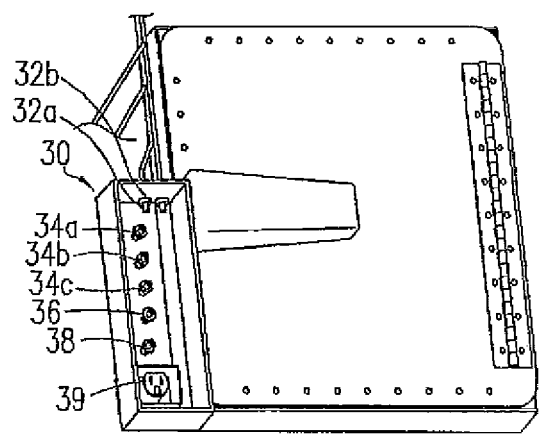
FIG. 13 is a partial detail view showing the connection ports and access door portion of the fumigation containment door.

A line connection housing 30 is disposed on door 10 adjacent to the hatch 14 on the outer surface of the portable containment door. The line connection housing 30 is preferably a separated region on the outer surface of the door that contains all of the connection ports necessary for performing the fumigation. The line connection housing 30 can be placed anywhere on the outer surface of the portable containment door 10 as is convenient for the performing of the fumigation. As best seen in FIG. 13, line connection housing 30 includes a plurality of connection ports. The connection ports include first and second pneumatic connection ports, referenced as 32a and 32b, each of which is in fluid communication with each of the pneumatic cylinders 16 for use in extending and retracting the pistons 16a to selectively engage and disengage the cargo container. More particularly, the pneumatic flow line connection ports couple to an external compressed air source that provides the pressurized gas that is required for actuation the pneumatic cylinders.

Connection housing 30 further includes three sampling line connections, referenced as 34a, 34b, and 34c. Sampling line connections 34a, 34b, and 34c, allow for connection of tubular sampling lines used to carry the sampled fumigant out from the interior of the cargo container during the fumigation process for sampling at a remote sampling station. The remote sampling station may be staffed by a member of the FDA or personnel trained to monitor fumigation methods and effectiveness. The sampled fumigant is subsequently used to determine the concentration of the fumigant at specific times during the fumigation process. In determining the concentration of the fumigant within the cargo container, the monitoring personnel can determine whether or not the required fumigant concentration level is reached, ensuring that all potential pests are exterminated. As is defined by the standards set forth in the PPQ compliance agreement, gas must be sampled from at least three points within the cargo container. As a result, at least three gas sampling flow line connectors are located within the line connection housing 30, however the design can be adjusted to incorporate the installation of multiple gas sampling flow line connectors, the number of which being determined by the specific fumigation process. A main fumigant introduction gas flow line connector 36 is provided to allow for connection to a fumigant introduction line, through which fumigant is flowed into the cargo container. In addition, connection housing 30 includes a gasket inflation connector 38, such as a Schrader valve, that allows for connection of a compressed air line to selectively inflate gasket 26, or alternatively allow for deflation of gasket 26. As discussed above, gasket inflation connector 38 is in fluid communication with the inflatable bubble portion 26b of gasket 26 whereby inflation of gasket 26 creates a generally air-tight seal with the inner structure of the shipping container. Finally, connection housing 30 includes an electrical power connector 39. Electrical power connector 39 can be any suitable means for coupling the containment door to an external electrical power source, and in the shown embodiment is a standard female electrical socket.

Figures 7, 8:
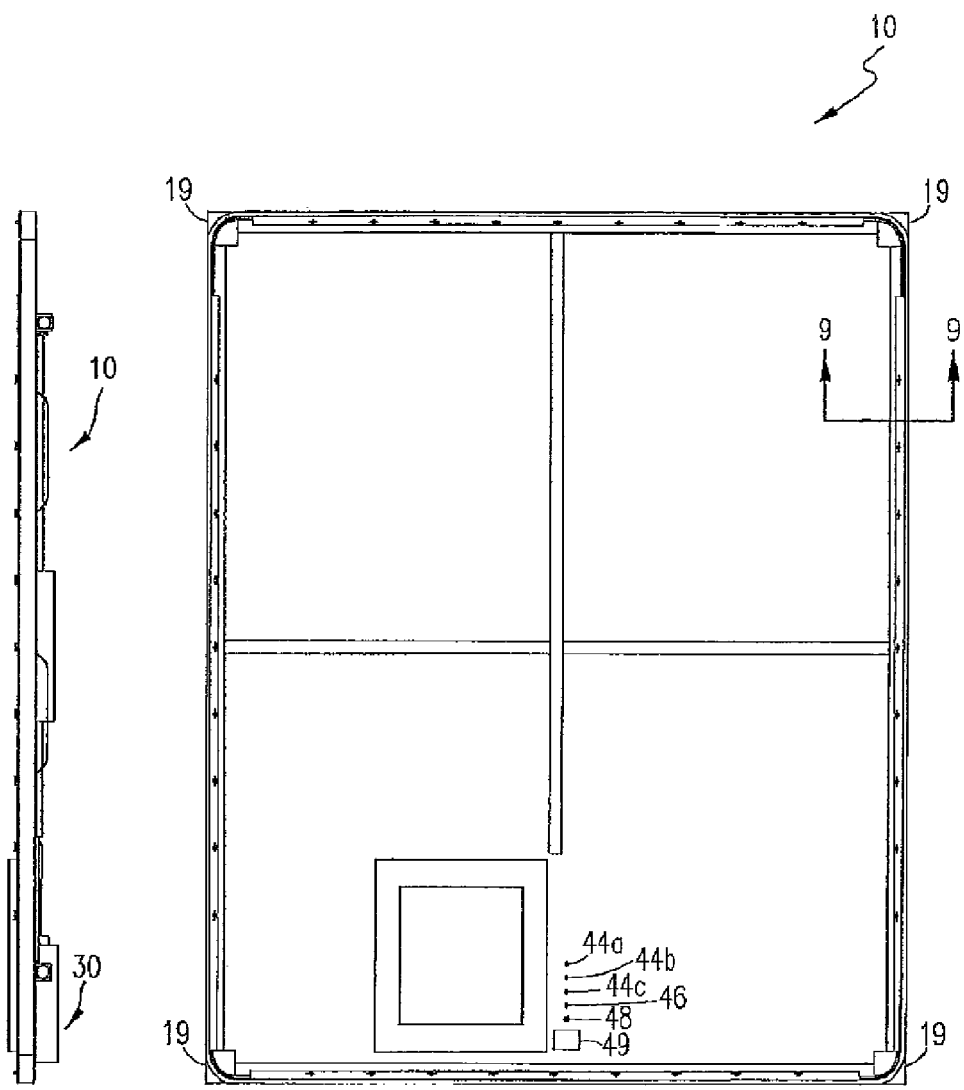
FIG. 7 is a side view thereof.
FIG. 8 is a rear (inner side) view thereof.

As best seen in FIG. 8, the back side of the portable containment door 10, namely the side that faces inward towards the contained volume during the fumigation process, has a corresponding series of connectors that serve as a means of connecting the components that are used inside of the cargo container during fumigation. The connections include multiple gas flow sampling line connectors 44a, 44b, and 44c, that provide connection ports for sampling lines. The sampling lines are placed in specific positions within cargo container and provide a means for out flowing fumigant samples during the fumigation process. These fumigant samples are used to determine the concentration of fumigant inside of the cargo container at specific times and positions. The number of sampling gas lines and corresponding number of sampling gas line connectors that are required to take accurate readings of the fumigant concentration is determined by the standards set forth by the PPQ compliance agreement. In the shown embodiment, three gas sampling line connectors 44 a-c are present as is typical of the requirement for most cargo containers. However, the number of gas sampling line connectors 44 of the present invention can be adjusted during manufacturing to include any number of sampling line connectors as may be required.

The connections further include a fumigant injection outlet port 46 that allows for coupling of a fumigant introduction line, which is subsequently positioned in a specific region wherein a circulating flow of fumigant can be created within the cargo container. As should be apparent, front side connector 36 and back side outlet port 46 allow for the introduction of fumigant through door 10 into the shipping container from a fumigant gas source that is contained outside of the cargo container. The connections further include a gasket inflation line 48 in fluid communication with gasket 26 which functions as a conduit for pressurized gas, typically air, to inflate gasket 26. An electrical connector 49 extends out from the back side of the door 10 to provide power to the electrical devices within the cargo container that are required for fumigation, and in particular circulation fans. Electrical connector 49 can be any suitable connection means based upon the means of electrical connection used by the devices that it is coupled to. Specifically, in the preferred embodiment, the electrical connector 49 consists of two female electrical sockets, the standard for most electrical devices in the United States. Access door 14 provides the fumigation technician with easy access to the connection ports and outlets located on the back side of door 10.

The method of performing a fumigation within a cargo container comprises the steps of first visually inspecting the cargo container for damage to the outside that could cause fumigant to escape. If the cargo container is fit for performing the fumigation, the required components for performing the fumigation are positioned inside of the cargo container. These required components include the gas sampling lines, the main fumigant introduction line, and the circulation fans. The ends of the gas and electrical flow lines that couple to the respective connectors on the back surface of the containment door are then placed so that they are still within the cargo container, but in close proximity to where the back surface line connectors are positioned.

After the components within the cargo container are set up and positioned correctly, the portable containment door is coupled to a forklift by threading the prongs of the forklift through the receiving channel members 12 that extend from the front surface of the portable containment door. The portable containment door is then lifted and positioned so that is within the frame of the main rear opening of the cargo container and so that the grooved flanges that support the hinged joint of the cargo container doors are aligned adjacent to the pistons of the pneumatic cylinders. Once the portable containment door is positioned properly, the pneumatic cylinders are activated with the actuation of the outstroke function, causing the pistons of the cylinders to displace into the grooved flanges that extend from the frame of the cargo container rear opening. The displacement of the pistons into the grooved flanges limits the movement of the door, thereby locking it into place.

Once the door is locked into place, the compressed air source for the peripheral gasket is activated, causing compressed air to flow through the gasket gas flow line and into the gasket. The pressurized gas flows into the gasket, causing it to inflate. As the gasket inflates it exerts a force against the rear opening frame leading to the formation of a seal between the cargo container and the portable containment door. With the door locked in place and the seal formed, the user may then open hatch 14 on the front outer surface of the door allowing access to the inner electrical and gas flow lines. Then the user reaches in and connects the lines to the associated line connectors on the back inner surface of the portable containment door. The lines and corresponding connectors include the series of gas sampling lines, the fumigant introduction line, and the fan electrical lines. Once the appropriate lines for performing the fumigation are connected inside of the space within the cargo container to the back inner surface of the portable containment door, the hatch is closed. After the hatch is closed, the appropriate lines outside of the cargo container are connected to the corresponding line connectors in the line connector housing that is located on the front outer surface of the door. These lines include the pneumatic gas flow lines, the main fumigant introduction line, the gasket gas flow line, the electrical line, and the gas sampling lines.

Figure 14:
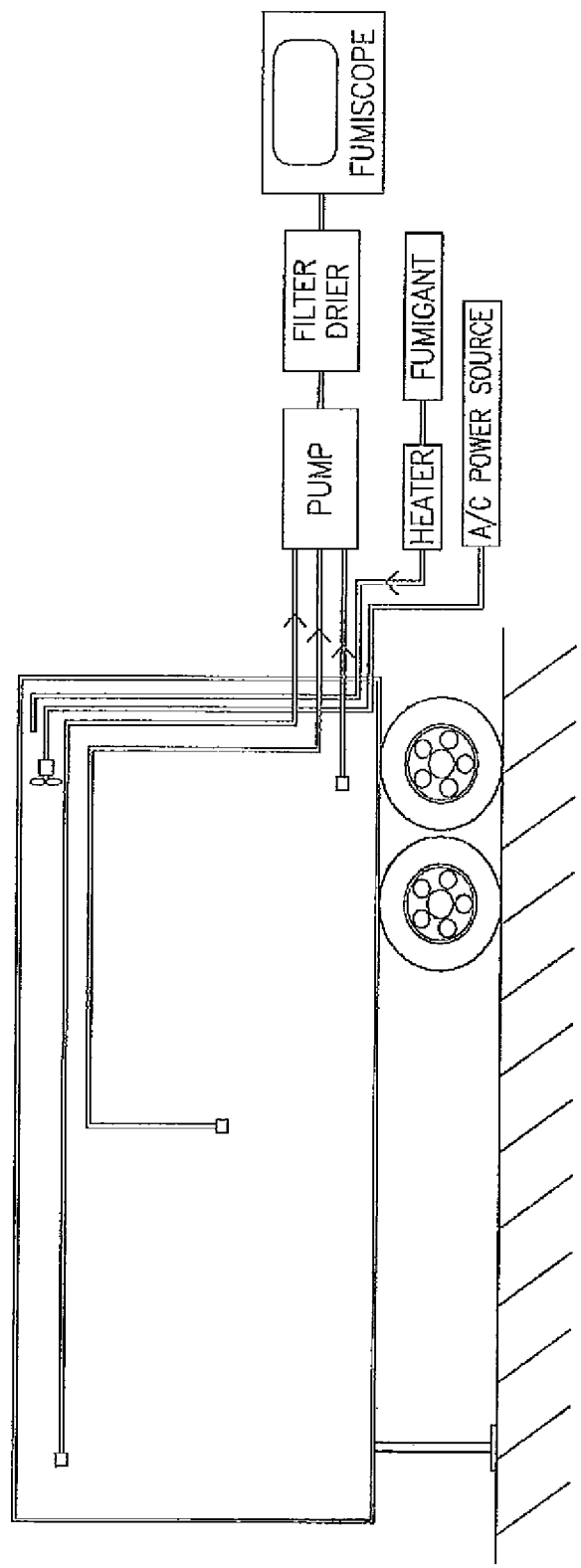
FIG. 14 is a schematic diagram of the fumigation system.

Once the door is successfully installed with the lines connected, the pressurized fumigant source is activated, causing the flow of a predetermined amount of fumigant through the main introduction line and into the space within the cargo container. In accordance with the standard set forth by the PPQ compliance agreement, a USDA inspector obtains gas samples from within the cargo container via sampling lines connected to connection ports 34*a*, 34*b*, and 34*c*. This sampled gas is flowed into a filter that includes Drierite®, a desiccant for removing water moisture, and Ascartie®, an absorbing substance used for removing carbon dioxide from the sampled gas. Once the sampled gas passes through the filter, it is then flowed into a fumiscope, where the concentration of fumigant from the sampled gas obtained at a specific point within the cargo container is determined. As best illustrated in FIG. 14, fumigant concentration levels are sampled, typically using three sampling tubes, to determine whether a predetermined concentration level has been achieved throughout the contained volume. If the concentration level is too low, then additional fumigant may be introduced. Conversely, if the concentration level is too high, then the fumigation time may be reduced. Upon completion of the fumigation process, which includes passage of a predetermined period of time, the containment door is removed and the aeration procedure is initiated in compliance with governing requirements and standards.

The present invention further contemplates adapting containment door 10 with the following additional structural and functional features. First, door 10 may be adapted to include a heat exchanger in heat transfer communication with the fumigant introduction line for the purpose vaporizing the fumigant prior to introduction into the shipping container. In addition, door 10 may have fans incorporated into the door structure to provide for post-fumigation aeration of the shipping container. Finally, door 10 may be adapted with a vapor compression refrigeration unit (or air conditioning unit) for the purpose of maintaining a predetermined interior temperature within the shipping container during the fumigation process. Providing a temperature controlled interior is considered important in maintaining the quality of perishable goods, particularly delicate goods such as flowers.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A method of fumigating the contents of a container having a main opening with at least one door, said method comprising the steps of:
    (a) placing at least one circulation fan in fluid communication with the interior of the container;
    (b) positioning at least one containment door in the container main opening;
    (c) forming a seal between said at least one containment door and the container;
    (d) injecting fumigant into the container until a predetermined fumigant concentration is achieved;
    (e) monitoring fumigant concentration; and
    (f) maintaining a predetermined fumigant concentration for a predetermined time period by selectively injecting additional fumigant.

2. A method of fumigating the contents of a container according to claim 1, wherein at least one of said at least one containment door comprises:
    a main body sized in relation to the container opening;
    means for providing sealing engagement between said main body and said container;
    said main body further including an opening with a hatch configurable between open and closed positions for providing access to the interior of said container when said main body is disposed in covering relation with said container opening.

3. A method of fumigating the contents of a container according to claim 1, wherein said portable containment door further includes a fumigant introduction gas flow line connector for connection to a fumigant introduction line to allow for the introduction of fumigant through the containment door.

4. A method of fumigating the contents of a container according to claim 1, wherein said portable containment door further includes at least one sampling line connection adapted for connection to at least one tubular sampling line to allow for monitoring of fumigant concentration within the container.

5. A method of fumigating the contents of a container according to claim 2, wherein said means for securing said main body relative to said container with said main body disposed in covering relation with said container opening includes at least one pneumatic cylinder having a piston selectively configurable for engaging and disengaging the container.

6. A method of fumigating the contents of a shipping container, said shipping container defining a main opening and including a pair of doors configurable between a closed configuration and an open configuration, said method comprising the steps of:
    (a) placing at least one circulation fan in the container;
    (b) placing at least one fumigant introduction line in the container;
    (c) placing at least one gas monitoring line in at least one predetermined position within the container;
    (d) providing a portable containment door, said portable containment door including a rigid main body sized for mating engagement with the container in substantial covering relation with the container opening, said main body including peripheral edge, said peripheral edge including an inflatable gasket for sealing engagement with said container;
    (e) placing said portable containment door in the container main opening;
    (f) forming a seal between the peripheral edge of said portable containment door and the container;
    (g) electrically connecting said circulation fan to an external electrical power source;
    (h) fluidly connecting said at least one fumigant introduction line to an external fumigant source;
    (i) fluidly connecting said at least one gas monitoring line to an external means for monitoring fumigant concentration;
    (j) injecting fumigant into the container via said at least one fumigant introduction line until a predetermined fumigant concentration is achieved;
    (k) monitoring fumigant concentration; and (l) maintaining a predetermined fumigant concentration for a predetermined time period by selectively injecting additional fumigant.

\* \* \* \* \*